March 17. 1925.

C. E. GOOD

FISHING FLOAT

Filed Oct. 31, 1923

Inventor

C. E. Good.

By Lacey & Lacey, Attorneys

March 17, 1925.  
C. E. GOOD  
FISHING FLOAT  
Filed Oct. 31, 1923
1,529,949
2 Sheets-Sheet 2
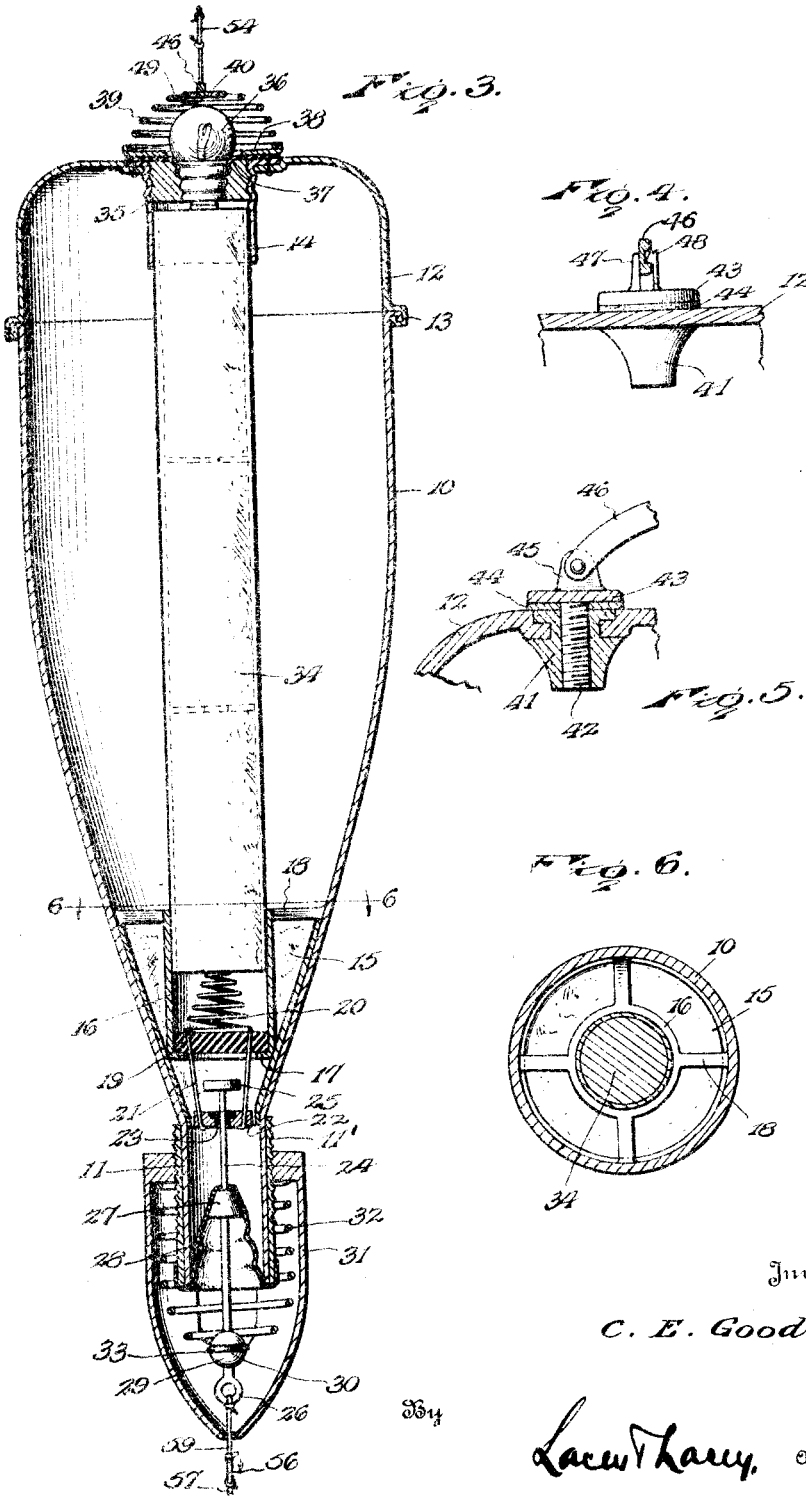
Inventor  
C. E. Good.

Patented Mar. 17, 1925.

1,529,949

UNITED STATES PATENT OFFICE.

CECIL E. GOOD, OF WILSEY, KANSAS.

FISHING FLOAT.

Application filed October 31, 1923. Serial No. 671,960.

*To all whom it may concern:*

Be it known that I, CECIL E. GOOD, citizen of the United States, residing at Wilsey, in the county of Morris and State of Kansas, have invented certain new and useful Improvements in Fishing Floats, of which the following is a specification.

This invention relates to an improved fishing float and seeks, among other objects, to provide a float embodying a signal lamp which will be energized by the nibbling of a fish upon a line attached to the float.

The invention seeks, as a further object, to provide a float which will be sensitive in operation and wherein the internal mechanism of the float will be effectually protected from the water.

And the invention seeks, as a still further object, to provide a float wherein the battery employed may be readily renewed.

Other and incidental objects will appear hereinafter.

In the drawings:

Figure 3 is a vertical sectional view taken medially through the device,

Figure 4 is a detail view showing the catch for the retaining bar of the guard spring for the lamp employed, Figure 5 is a detail sectional view showing the mounting of the retaining bar, and Figure 6 is a transverse sectional view on the line 6—6 of Figure 3, looking in the direction of the arrows.

Figures 1, 2:
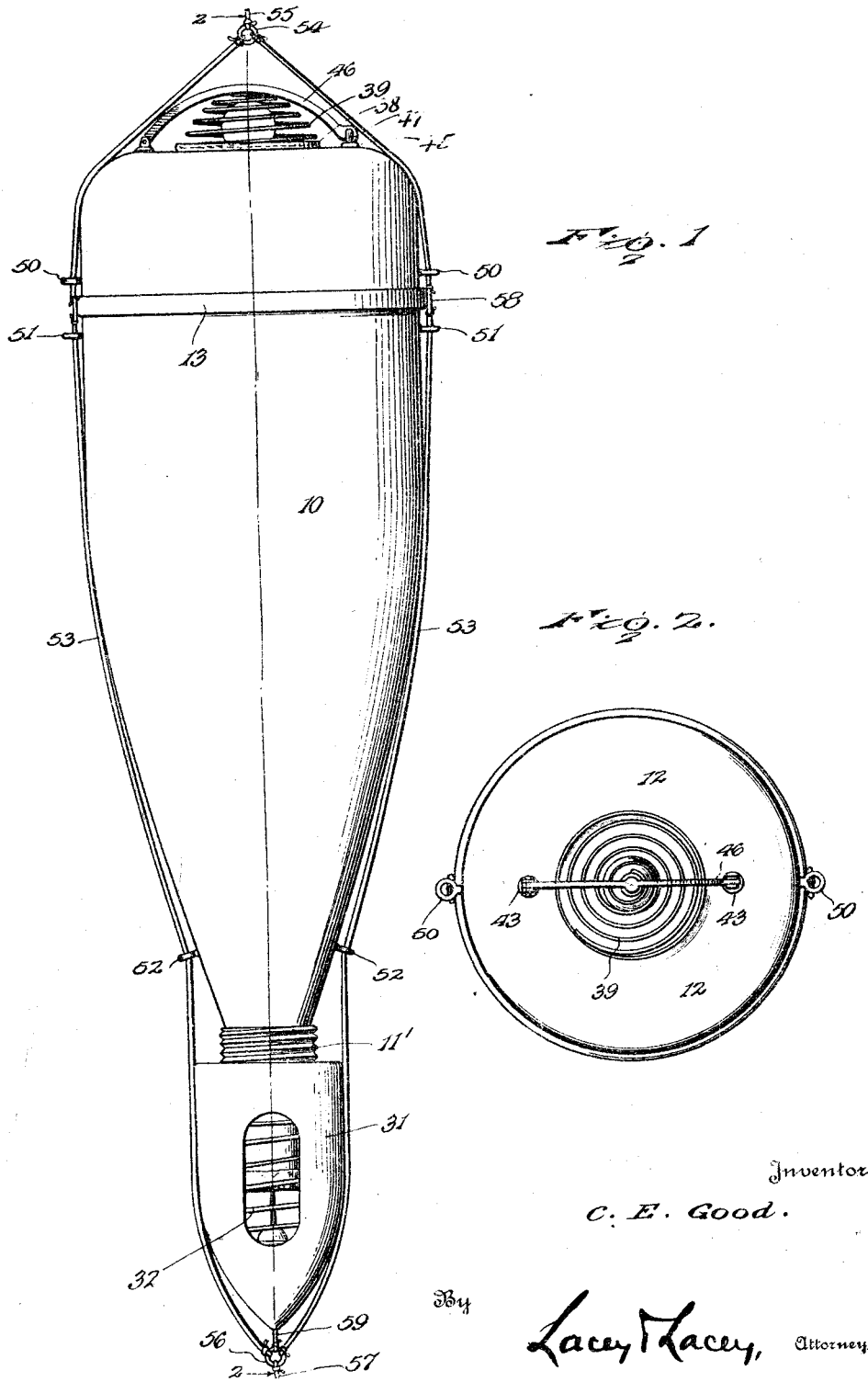
Figure 1 is an enlarged side elevation of my improved float.
Figure 2 is a top plan view of the device.

In carrying out the invention, I employ a cylindrical shell 10 tapered toward its lower end and provided with a terminal nipple 11 upon which is rigidly fixed an externally threaded sleeve 11' forming, in effect, a unitary part of the nipple. The shell is preferably made in two parts to embody a cap 12 crimped upon the body of the shell as indicated at 13, and mounted on the cap in axial alinement with the nipple 11 is a depending sleeve 14 flanged at its upper end to overlie the cap and riveted or otherwise fastened thereto. Fitting in the lower tapered end of the shell is a jacket 15 of suitable insulating material and resting against said jacket in alinement with the sleeve 14 is a sleeve 16 provided at its lower end with an inwardly directed annular flange 17 and at its upper end with a spider 18 centering the sleeve within the shell.

Resting upon the flange 17 is a disk 19 of suitable insulating material and appropriately secured to the disk at its upper side is an upstanding contact spring 20. Depending from the disk are spaced hangers 21 connected to the base end of the spring 20 and mounted upon the lower ends of said hangers is a metal contact disk or member 22. Extending through said member centrally thereof is an appropriate bushing 23 of suitable insulating material and slidable through said bushing is a circuit closer rod 24 provided at its upper end with a head 25 while at its lower end the rod is provided with an eye 26. Appropriately secured to the rod near its upper end is a cone-shaped rubber button 27 and cemented or otherwise attached at its smaller end to said button is a cone-shaped rubber apron 28, the larger end of which is folded upwardly over the lower end of the nipple 11 and is suitably secured thereto so that the apron will thus function to close the nipple. Formed on the rod 24 near its lower end is a ball 29 in which is formed an annular groove 30 and threaded over the sleeve 11' is a casing 31 housing a spring 32 surrounding the nipple. At its upper end the spring is secured to the end wall of said casing while at its lower end portion the convolutions of the spring are gradually contracted so that the spring is thus formed at its lower extremity with a split loop or eye 33 snugly fitting in the groove 30 of the ball. Accordingly, as will be seen, the spring will normally function to hold the circuit closer rod elevated and maintain the head 25 thereof spaced above the contact member 22. The casing 31 is preferably tapered at its lower end portion and is provided at opposite sides thereof with elongated openings so that after the casing is applied to the sleeve 11', the loop 33 may be reached through said openings and engaged in the groove of the ball.

Inserted through the sleeve 4 of the cap 12 to rest at its lower end in the sleeve 16, is an appropriate battery 34, the terminal at the lower end of which contacts the spring 20 and removably threaded into the sleeve 14 at its upper end is a reducing ring 35 forming a socket for an electric lamp 36. Thus, as will be seen, the spring 20 will urge the battery upwardly so that the terminal at the upper end of the battery will be held against the terminal at the base of the lamp. Surrounding the lamp is a gasket 37, the inner margin of which is clamped between the base of the lamp and the ring 35 and overlying said gasket is a clamping ring 38. Resting at its larger end upon the ring is a volute spring 39 forming a guard or cage for the lamp and mounted within the small convolution of the spring at its upper end is a plate 40. Flanged onto the wall of the cap at opposite sides of the sleeve 14 are bosses 41 into which are threaded studs 42 having heads 43, and clamped between said heads and the cap are gaskets 44 forming sealed joints between the studs and the cap. Rising from the head of one of said studs are spaced ears 45 between which is pivoted a retaining bar 46 curved to extend over the spring 39 and rising from the head of the other of said studs is a post 47 opposite which is disposed a spring catch 48 to engage the notched free end of the bar retaining the free extremity of the bar between said post and the catch. Formed on the bar is, as shown in Figure 3, a medial depending stud 49 extending through the plate 40 of the spring so that the spring will thus be held against accidental displacement while the bar will function to compress the spring which, in turn, will press the ring 38 against the outer margin of the gasket 37 to maintain a sealed joint between the gasket and the cap 12.

Projecting from the cap at opposite sides thereof are eyelets 50 and alining with said eyelets are similar eyelets 51 upon the shell. Near its lower end, the cap is further provided with like eyelets 52 and extending through said eyelets are the side lines 53 of a bridle for the float. At their upper ends, the side lines 53 are connected to a ring 54 to which may be attached a line 55 from a fishing pole, while at their lower ends the side lines 53 are connected to a similar ring 56 to which is attached a line 57 carrying a suitable hook. Interposed in the side lines between the eyelets 50 and 51 are rings 58 adapted to engage said eyelets for limiting the float against longitudinal movement upon the side lines and extending from the eye 26 of the circuit closer rod 24 through the lower end of the casing 31 is a short length of line 59 attached to the ring 56 for connecting the circuit closer rod with the line 57.

As will now be seen in view of the foregoing, when a fish jerks upon the line 57, the circuit closer rod 24 will be pulled downwardly so that the head 25 thereof will be moved into engagement with the contact member 22. Accordingly, a circuit from the lamp 36 will be closed through the shell 10 to the casing 31 and thence through the spring 32 to the rod 24 and through the head 25 and contact member 22 to the hangers 21 and thence through the spring 20 to the negative side of the battery. The lamp 36 will thus be energized to signal the fisherman of the catch. Should it be desired to leave the device unattended, in which event the functioning of the signal would not be desired, the casing 31 may be threaded upwardly upon the nipple 11 to abut the eye 26 of the circuit closer rod 24 when the casing will serve to hold the rod elevated in open circuit position, thus rendering the signal mechanism inactive.

Having thus described the invention, what is claimed as new is:

1. A fishing float including a shell provided at one end with a sleeve, a sleeve mounted in the shell near its opposite end and provided with a spider to coact with the shell centering the sleeve therein, a battery supported by said sleeves, an electric lamp at one end of the battery in circuit therewith, and means at the opposite end of the battery operable by a fishing line for closing the circuit through the battery and lamp.

2. A fishing float including a shell having internal alined sleeves, a battery supported by said sleeves, an electric lamp associated with one of said sleeves in circuit with the battery, a disk fitting in the other of said sleeves, a spring bearing between said disk and the battery urging the battery into electrical contact with the lamp, and a circuit closer suspended from said disk and operable by a fishing line for closing the circuit through the battery and lamp.

3. A fishing float including a shell having internal alined sleeve, a battery supported by said sleeves, an electric lamp associated with one of said sleeves in circuit with the battery, a disk fitting in the other of said sleeves, a spring bearing between said disk and the battery urging the battery into electrical contact with the lamp, hangers depending from the disk in circuit with the spring, a contact member carried by said hangers, a rod slidable through said member but insulated with respect thereto and provided with a head, and a spring normally holding the head of the rod out of contact with said member, the rod being movable by a fishing line to engage the head thereof with said contact member for closing the circuit through the battery and lamp.

4. A fishing float including a shell provided at its lower end with a nipple, a battery mounted within the shell, an electric lamp in circuit with the battery, a circuit closer projecting through said nipple and operable by a fishing line for closing the circuit through the battery and lamp, and a flexible apron extending between the circuit closer and nipple closing the nipple.

5. A fishing float including a shell provided at its lower end with a nipple, a battery mounted within the shell, an electric lamp in circuit with the battery, a circuit closer operable by a fishing line for closing the circuit through the battery and lamp, a casing screwed upon said nipple, and a spring housed within said casing and connected to the circuit closer for normally maintaining said circuit closer in open circuit position.

6. A fishing float including a shell, a battery mounted therein, an electric lamp in circuit with the battery, a circuit closer operable by a fishing line for closing the circuit through the battery and lamp, a casing carried by the shell, a spring housed within said casing and connected to the circuit closer for normally maintaining said circuit closer in open circuit position, and means to adjust the casing to a position for limiting the circuit closer in open circuit position.

7. A fishing float including a shell, a battery mounted therein, an electric lamp in circuit with the battery, means operable by a fishing line for closing the circuit through the battery and lamp, a gasket surrounding the lamp in contact with the shell, and a spring surrounding the lamp to form a guard therefor and pressing the gasket against the shell to form a sealed joint therebetween.

8. A fishing float including a shell, provided at its lower end with a nipple, a battery mounted within the shell, an electric lamp in circuit with the battery, a circuit closer operable by a fishing line for closing the circuit through the battery and lamp and including a rod having a shoulder thereon, a casing engaged with said nipple, and a spring housed within said casing and engaged with said shoulder for normally maintaining said circuit closer in open circuit position.

In testimony whereof I affix my signature.

CECIL E. GOOD. [L. S.]